(12) United States Patent
Nelson et al.

(10) Patent No.: US 8,787,517 B2
(45) Date of Patent: Jul. 22, 2014

(54) ABSORBER TUBE FOR BWR CONTROL RODS

(75) Inventors: Dennis S. Nelson, Wilmington, NC (US); Stephen J. Studer, Wilmington, NC (US)

(73) Assignee: General Electric Company, Schenectady, NY (US)

( * ) Notice: Subject to any disclaimer, the term of this patent is extended or adjusted under 35 U.S.C. 154(b) by 753 days.

(21) Appl. No.: 11/325,459

(22) Filed: Jan. 5, 2006

(65) Prior Publication Data

US 2007/0153956 A1 Jul. 5, 2007

(51) Int. Cl.
*G21C 3/326* (2006.01)
*G21C 7/10* (2006.01)

(52) U.S. Cl.
USPC .......................................... 376/333; 376/327

(58) Field of Classification Search
USPC ......... 376/327, 333, 207, 260, 353, 458, 463; 228/47, 182, 183, 184
See application file for complete search history.

(56) References Cited

U.S. PATENT DOCUMENTS

| | | | | |
|---|---|---|---|---|
| 2,917,444 A | * | 12/1959 | Dreffin | 376/328 |
| 4,295,620 A | * | 10/1981 | LeClou | 248/154 |
| 4,861,544 A | * | 8/1989 | Gordon | 376/333 |
| 4,902,470 A | * | 2/1990 | Dixon et al. | 376/333 |
| 4,929,412 A | * | 5/1990 | Dixon et al. | 376/260 |
| 5,064,602 A | * | 11/1991 | Cearley et al. | 376/243 |
| 5,706,318 A | * | 1/1998 | Ledford et al. | 376/327 |
| 5,719,912 A | * | 2/1998 | Ledford et al. | 376/327 |
| 5,812,623 A | * | 9/1998 | Holden et al. | 376/260 |

FOREIGN PATENT DOCUMENTS

| | | | |
|---|---|---|---|
| EP | 0337736 A2 | * | 10/1989 |
| EP | 0337736 A2 | | 10/1989 |
| EP | 0338772 A2 | | 10/1989 |
| EP | 0338772 A2 | * | 10/1989 |
| JP | 57-086086 A | | 5/1982 |
| JP | 57-086086 A | * | 5/1982 |
| JP | 02-013888 A | * | 1/1990 |
| JP | 02-013888 A | | 1/1990 |
| JP | 02-013889 A | * | 1/1990 |
| JP | 02-013889 A | | 1/1990 |
| JP | 09-061575 A | * | 3/1997 |
| JP | 09061575 A | | 3/1997 |
| JP | 10-002983 A | | 1/1998 |
| JP | 10-002983 A | * | 1/1998 |
| JP | 2007 183267 A | * | 7/2007 |
| JP | 2007183267 A | | 7/2007 |

OTHER PUBLICATIONS

Hogue et al. "Application of design functionality rules in CAD/CAM", IPROMS 2005 Conference.*

(Continued)

*Primary Examiner* — Jack W Keith
*Assistant Examiner* — Sean Burke
(74) *Attorney, Agent, or Firm* — Harness, Dickey & Pierce, PLC

(57) ABSTRACT

In a control rod having a plurality of elongated members for absorbing neutrons within a nuclear reactor to control a nuclear reaction, each elongated member may include a cylindrical inner capsule configured to contain neutron absorbing material therein. The elongated member may also include an absorber tube enclosing the cylindrical inner capsule, the absorber tube having an outer surface configured with a plurality of generally flat, planar sides between adjacent rounded corners.

18 Claims, 5 Drawing Sheets

(56) References Cited

OTHER PUBLICATIONS

Folkestad et al., "Engineering Drawing and Design", Cengage Learning, 2001.*

JPO Action dated Jul. 24, 2012 for JP 2006 350900.*

Japanese Office Action dated Jul. 24, 2012 for corresponding Japanese Application No. 2006-350900 (full translation provided).

* cited by examiner

ABSORBER TUBE FOR BWR CONTROL RODS

BACKGROUND OF THE INVENTION

Nuclear reactors typically include control rods containing materials for neutron absorption and for either shutting down or shaping nuclear reactions. Conventional control rods (or control blades) in Boiling Water Reactors (BWR), have a cruciform shape and pass in complementary cruciform shaped interstices (called fuel channel gaps) between fuel assemblies of fuel rods.

Prior art control rods consist of a plurality of elongated members, configured side-by-side to form a planar member. These elongated members, known as absorber tubes, are sealed at both ends and may contain capsules containing boron carbide powder, or other neutron absorbing materials such as hafnium rods.

Four planar members, each consisting of a plurality of absorber tubes, are welded to a central generally cruciform member, to form a cruciform shaped control rod.

U.S. Pat. Nos. 4,929,412 and 4,902,470 disclose a control rod 100 including an absorber tube T with four discrete right angle corners. As shown in FIG. 1, adjacent absorber tubes T are welded together at corners 10, where reference numeral 20 indicates welded material between adjacent absorber tubes.

FIG. 2 is a perspective view illustrating a control rod, coming up from under four side-by-side fuel channels, for absorbing neutrons in the control of a nuclear reaction. FIG. 2 illustrates how fuel assemblies are arranged around control rods on a BWR. The nuclear reactors have fuel channels 14 containing fuel rods 16. Interior of the fuel rods 16 are placed the nuclear fuel pellets which generate the chain nuclear reaction. BWR type reactors introduce the control rods from the bottom towards the top. Such a control rod R is shown in FIG. 2 coming up between the respective fuel channels 14 separating fuel assemblies of fuel rods 16.

BRIEF DESCRIPTION OF THE INVENTION

An example embodiment of the present invention is directed to a control rod having a plurality of elongated members for absorbing neutrons within a nuclear reactor to control a nuclear reaction. Each elongated member may include a cylindrical inner capsule configured to contain neutron absorbing material therein, and may include an absorber tube enclosing the cylindrical inner capsule. The absorber tube may have an outer surface configured with a plurality of generally flat, planar sides between adjacent rounded corners, or adjacent planar corners.

Another example embodiment of the present invention is directed to a control rod for absorbing neutrons within a reactor core. The control rod includes four planar members extending from a central vertical axis to form a cruciform shape. Each of the planar members may further include a plurality of elongated members configured in side-by-side relation. Each elongated member may further include a cylindrical inner capsule configured to contain neutron absorbing material therein, and an absorber tube enclosing the cylindrical inner capsule. The absorber tube may have an outer surface configured with a plurality of generally flat, planar sides between adjacent rounded corners, or adjacent planar corners. The control rod may include a cruciform-shaped tie rod segment provided along the central vertical axis to brace the four planar members with respect to each other, a velocity limiter attached to the control rod at a lower end thereof and handle to the control rod at an upper end thereof.

Another example embodiment of the present invention is directed to an absorber-tube for a BWR control rod. The absorber tube may include an elongate member having a generally cylindrical inner surface enclosing an inner capsule that is configured to contain neutron absorbing material therein. The elongate member has an outer surface configured to have generally flat, planar sides. Each planar side is arranged between adjacent rounded corners, or adjacent planar corners, of the outer surface of the elongate member.

BRIEF DESCRIPTION OF THE DRAWINGS

The example embodiments of the present invention will become more fully understood from the detailed description given herein below and the accompanying drawings, wherein like elements are represented by like reference numerals, which are given by way of illustration only and thus are not limiting of the example embodiments of the present invention.

DETAILED DESCRIPTION OF THE EXAMPLE EMBODIMENTS

Figure 3:
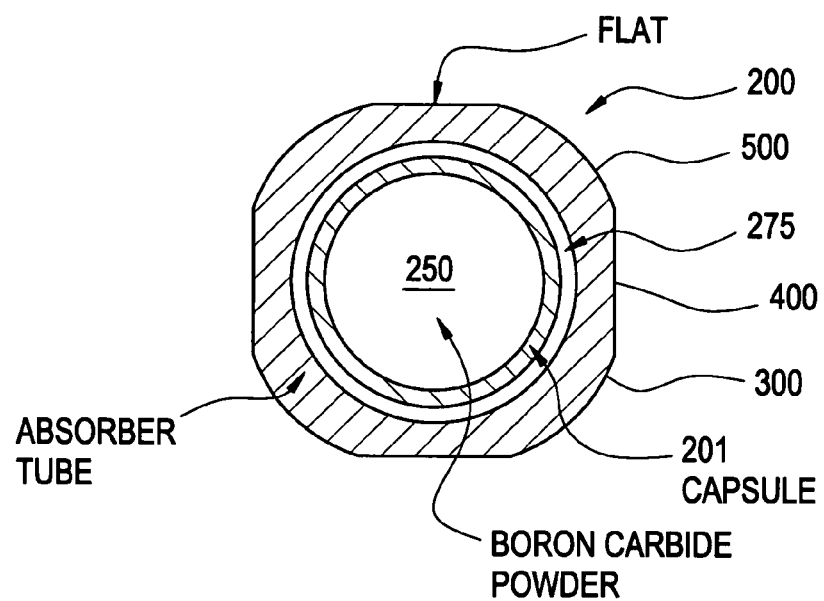
FIG. 3 is a horizontal sectional view of an absorber tube according to an example embodiment of the present invention.

FIG. 3 illustrates a horizontal sectional view of an absorber tube according to an example embodiment of the present invention. The control rod may be comprised of a plurality of elongate members; a cross-section of a single elongate member is shown in FIG. 3. The elongate member 200 may include an absorber tube 300 having a round inside diameter and enclosing a capsule 201, and a generally round outside diameter with generally flat, planar areas or sides between four (4) rounded corners, as shown in FIG. 3. In another example embodiment, the flat planar sides may be between generally flat, planar corners. Neutron absorbing materials 250 such as boron carbide powder are contained in the cylindrical inner capsule 201. The absorber tube 300 may also enclose other neutron absorbing materials such as hafnium rods.

The outer surface of the absorber tube 300 has at least four (4) planar sections 400, with a rounded corner 500 between each planar section 400. In other words, an outer surface of the absorber tube 300 does not have an acute edge or corner. In another example embodiment, the corner sections 500 may be planar. In addition, there may be a gap 275 between the cylindrical inner capsule 201 and the absorber tube 300. The gap is generally filled with air and/or helium gas, and/or other suitable gases, for example. The simplified shape of the absorber tube 300 reduces the number of draw passes required to manufacture the tube, thereby reducing manufacturing cost.

The absorber tube 300 may be fabricated to discrete sizes. By way of example, a width of the absorber tube 300 is about 0.260 to 0.312 inches; a length of a planar side or section 400 is about 0.100 to 0.120 inches; an inner diameter of the capsule is about 0.204 to 0.252 inches; and a length between the outer planar section 400 and an inner section of the absorbing tube 300 (e.g., wall) is about 0.030 inches. Generally, control rods containing the absorber tube assemblies 200 are above 174 inches long. The length of fuel loading in a nuclear reactor may be in the range of about 144 to 150 inches.

Figure 1:
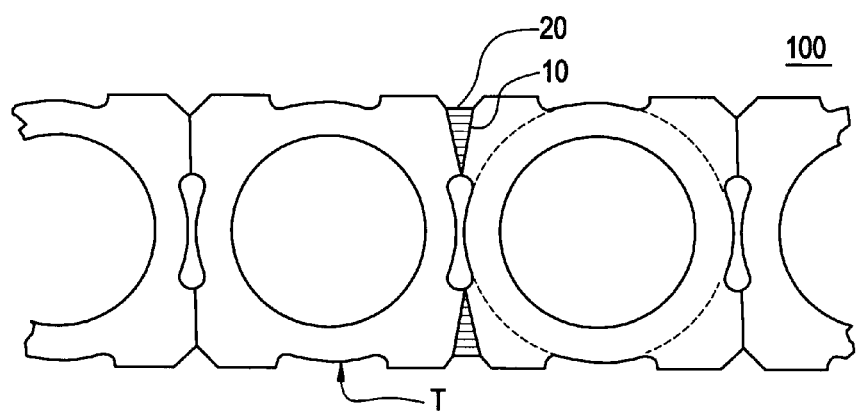
FIG. 1 a prior art absorber tube configuration.

The absorber tube 300 has a minimum wall thickness greater than the prior art absorber tube as illustrated FIG. 1, while maintaining the same absorber tube outer width. This results in an absorber tube able to withstand a higher internal pressure, yet occupies the same amount of space prior art absorber tubes. This is beneficial, since boron carbide powder 250 releases helium gas as it absorbs neutrons in a nuclear reactor, pressurizing the absorber tube 300.

Figure 4:
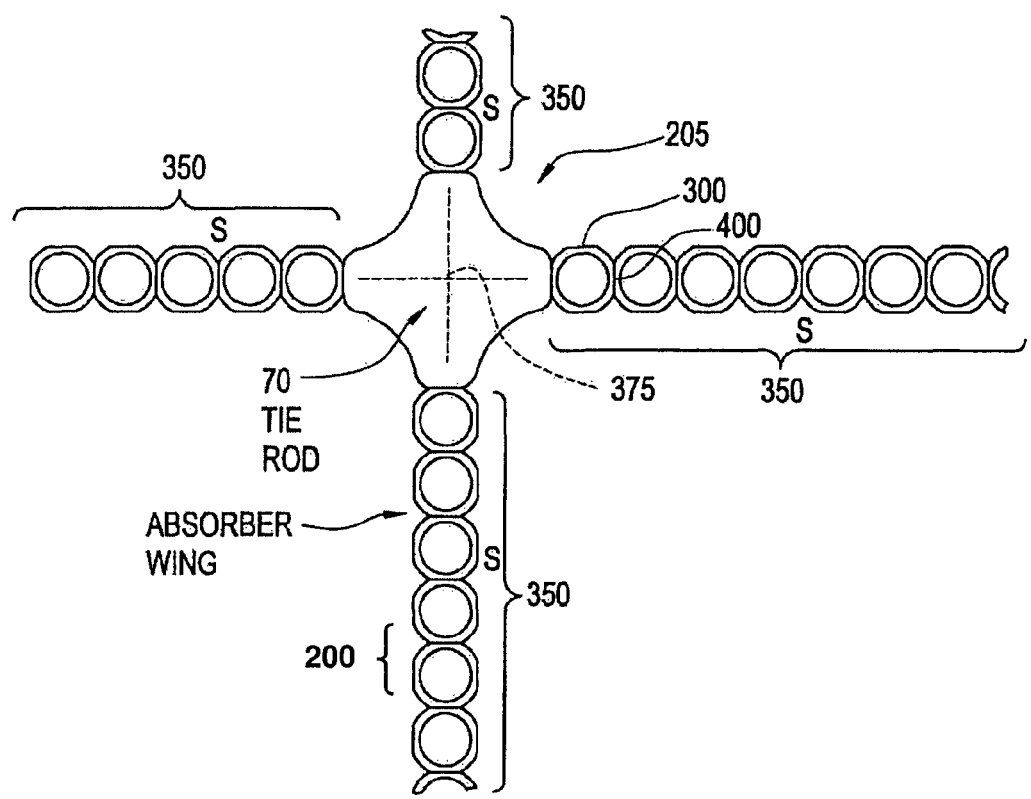
FIG. 4 partial view of a cruciform shaped control rod to illustrate side-by-side absorber tubes.

FIG. 4 illustrates a partial view of a cruciform-shaped control rod to illustrate the side-by-side arrangement of absorber tubes 300 therein. In FIG. 4, there is shown a cruciform-shaped control rod 205, which include a plurality of planar members 350 extending from a central axis (denoted by 375) and attached to a solid, tie rod 70 to form the cruciform shape of control rod 205. The weld location of the example embodiments of the present invention (as compared to FIG. 1) is closer to the centerline of the planar member 350. This allows the planar member 350 to be more flexible, allowing the cruciform-shaped control rod 205 to better conform to the bulging and bowing of the eight (8) sides of the adjacent fuel channels 14 (FIG. 2), which form a cruciform-shaped gap for the control rod 205. Additionally, the absorber tube 300 eliminates the interstitial region between the absorber tubes, unlike the prior art absorber tube (FIG. 1) thereby obviating the need to backfill the interstitial region with helium, which also reduces manufacturing cost.

Each planar member 350 includes a plurality of elongate members (e.g., absorber tubes 300). Each absorber tube 300 may be constructed as described with respect to FIG. 3. Each planar member 350 may thus include a plurality of absorber tubes 300 welded together in side-by-side relation. The tubes 300 may be welded by laser welding, electron beam welding or plasma welding, for example, which represent example welding technologies for joining the tubes 300. The planar section 400 of a given absorber tube 300 enables the tubes 300 to be welded in the side-by-side relation as shown in FIG. 4. The number of absorber tubes 300 in the control rod 205 may vary based on the dimensions of a given individual control rod 205.

Figure 2:
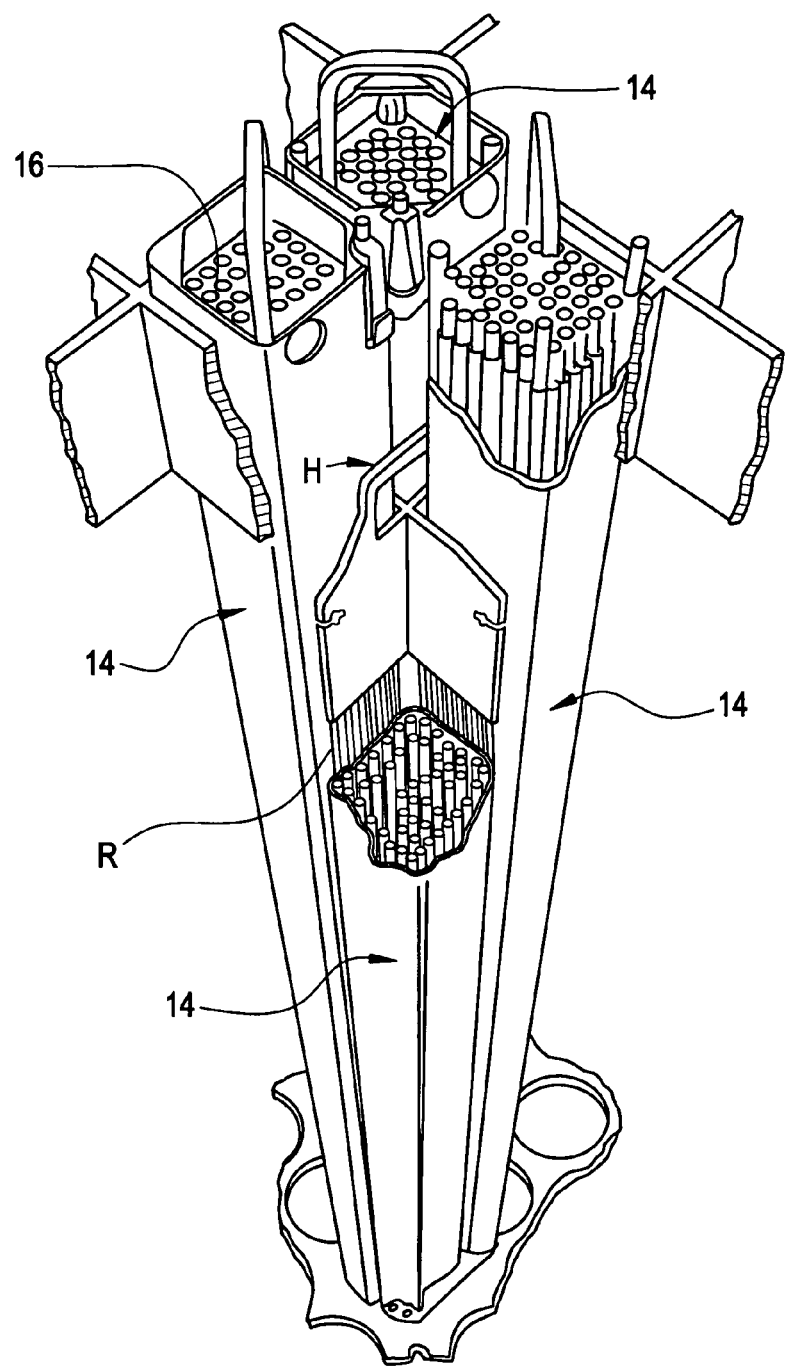
FIG. 2 is a perspective view illustrating a control rod coming up from under four side-by-side fuel channels for absorbing neutrons in the control of a nuclear reaction.
Figure 5:
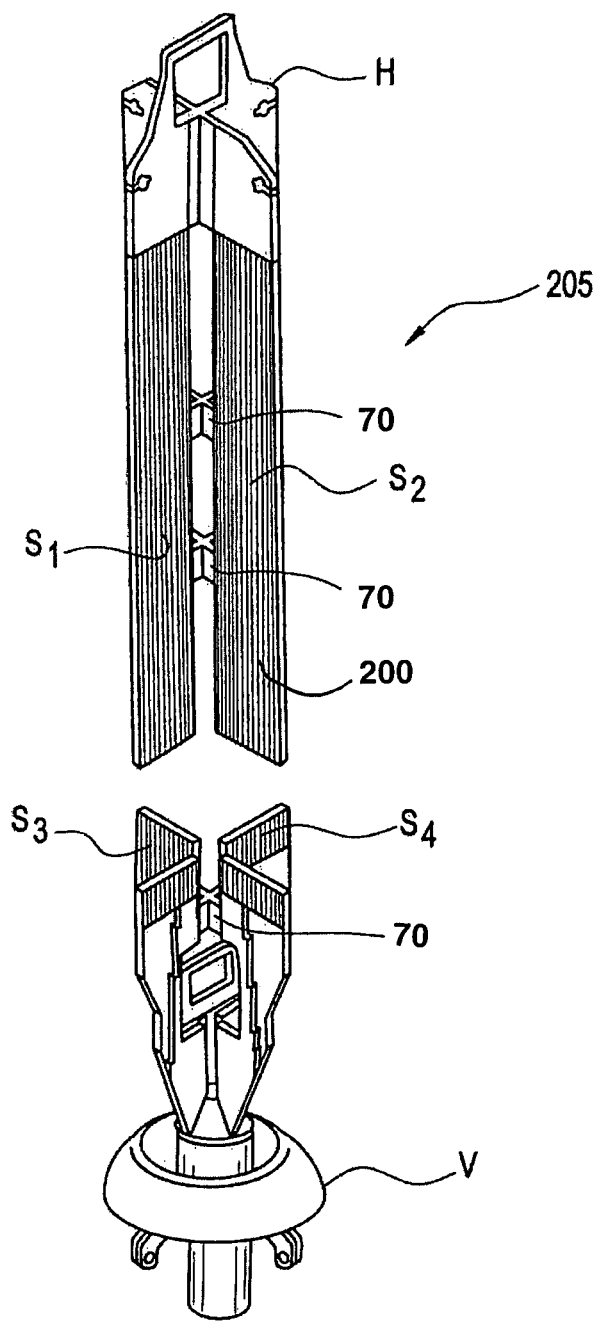
FIG. 5 illustrates a control rod clear of the fuel channels as show in FIG. 2.

FIG. 5 is a perspective view, partially broken away, illustrating the control rod 205 as clear of the fuel channels 14 shown in FIG. 2. The control rod 205 includes a velocity limiter V at a lower section, a handle H at a top section, and four respective planar members S1, S2, S3, and S4 (e.g., each of S1-S4 represents a planar member 350 in FIG. 4 each planar member 350 composed of a plurality of absorber tubes 300) therebetween. The control rod 200 includes a plurality of cruciform-shaped tie segments 70 placed at respective intervals to brace the respective planar sides S1-S4 one with respect to another. The tie segments 70 may be of a singular one piece construction along a longitudinal length of the control rod 200, or may be a plurality of tie segments 70 placed intermittently along the longitudinal length of the control rod 200. Segments 70 may be provided at intervals so that the control rod 200 may be flexible to enter fuel channels between dynamically bowed fuel assembles during seismic events. At the same time, the segments 70 may ensure a desired degree of columnar strength to prevent columnar buckling during a seismic event insertion.

The example embodiments of the present invention being thus described it will be obvious that the same may varied in many ways. Such variations are not to be regarded as a departure from the spirit and scope of the example embodiments of the present invention, and all such modifications as would be obvious to one skilled in the art are intended to be included within the scope of the following claims.

What is claimed is:

1. In a control rod having a plurality of elongated members for absorbing neutrons within a nuclear reactor to control a nuclear reaction, each elongated member comprising:
   a cylindrical inner capsule configured to contain neutron absorbing material therein; and
   an absorber tube enclosing the cylindrical inner capsule, the absorber tube having an outer surface with two opposing generally flat, planar, mating sides each of which is configured to mate flushly with a planar mating side of an adjacent absorber tube without the existence of a gap between the mated absorber tubes, the opposing flat, planar, mating sides each being located directly in between respective adjacent rounded corners that are convex in relation to the center of the capsule,
   wherein a line bisecting each of the flat, planar, mating sides is substantially collinear with a central axis of the control rod.

2. The control rod of claim 1, wherein the plurality of elongated members are arranged in side-by-side relation.

3. The control rod of claim 1, wherein the plurality of elongated members extend from the central axis of the control rod to form a cruciform shape of the control rod.

4. The control rod of claim 2, wherein each flat, planar, mating side provides a weld surface area for attachment to an adjacent absorber tube.

5. A control rod for absorbing neutrons within reactor core, comprising:
   four planar members extending from a central axis to form a cruciform shape, each of the planar members including a plurality of elongated members configured in side-by-side relation, wherein each elongated member further comprises:
   a cylindrical inner capsule configured to contain neutron absorbing material therein; and
   an absorber tube enclosing the cylindrical inner capsule, the absorber tube having an outer surface configured with two opposing generally flat, planar, mating sides each of which is configured to mate flushly with a planar mating side of an adjacent absorber tube without the existence of a gap between the mated absorber tubes, the opposing flat, planar, mating sides each being located directly in between respective adjacent rounded corners that are convex in relation to the center of the capsule,
   wherein a line bisecting each of the flat, planar, mating sides is substantially collinear with the central axis of the control rod;
   a cruciform-shaped tie segment provided along the central axis to brace the four planar members with respect to each other;
   a velocity limiter attached to the control rod at a lower end thereof; and
   a handle to the control rod at an upper end thereof.

6. The control rod of claim 5, wherein planar mating sides of the absorber tubes provide weld area surfaces for attachment to an adjacent absorber tube.

7. The control rod of claim 5, wherein the cruciform-shaped tie segment includes a plurality of cruciform-shaped tie segments arranged intermittently along the central axis.

8. The control rod of claim 5, wherein the cruciform-shaped tie segment extends an entire length of the absorber tube.

9. An absorber-tube for a BWR control rod, comprising:
an elongate member having a generally cylindrical inner surface enclosing an inner capsule that is configured to contain neutron absorbing material therein, the elongate member having an outer surface with two opposing generally flat, planar, mating sides each of which is configured to mate flushly with a planar, mating side of an adjacent elongate member, the opposing flat, planar, mating sides each being located directly in between respective adjacent rounded corners that are convex in relation to the center of the capsule,
wherein a line bisecting each of the flat, planar, mating sides is substantially collinear with a central axis of the control rod.

10. The absorber tube of claim 9, wherein a cylindrical gap is provided between the inner capsule and inner cylindrical surface of the elongate member.

11. The absorber tube of claim 9, wherein the neutron-absorbing material is boron carbide powder.

12. The control rod of claim 1, wherein the two opposing mating sides each include only one generally flat, planar, mating surface configured to mate with an opposing mating side of an adjacent absorber tube.

13. The control rod of claim 1, wherein the two opposing mating sides each include a generally flat, planar, mating surface configured to mate with an opposing mating side of an adjacent absorber tube, the generally flat, planar, mating surface extending from one of the rounded corners to another of the rounded corners.

14. The control rod of claim 5, wherein the two opposing mating sides each include only one generally flat, planar, mating surface configured to mate with an opposing mating side of an adjacent absorber tube.

15. The control rod of claim 5, wherein the two opposing mating sides each include a generally flat, planar, mating surface configured to mate with an opposing mating side of an adjacent absorber tube, the generally flat, planar, mating surface extending from one of the rounded corners to another of the rounded corners.

16. The absorber tube of claim 9, wherein the two opposing mating sides each include only one generally flat, planar, mating surface configured to mate with an opposing mating side of an adjacent absorber tube.

17. The absorber tube of claim 9, wherein the two opposing mating sides each include a generally flat, planar, mating surface configured to mate with an opposing mating side of an adjacent absorber tube, the generally flat, planar, mating surface extending from one of the rounded corners to another of the rounded corners.

18. The absorber tube of claim 9, wherein an outside perimeter of the absorber tube includes only four curved corners and four flat sides.

* * * * *